Patented July 29, 1947

2,424,870

UNITED STATES PATENT OFFICE 2,424,870

PROCESS OF FREEZING COMESTIBLES

Charles H. Welling, New Canaan, Conn., and Clarence K. Reiman, Newton, Mass., assignors to Z Pack Corporation, Boston, Mass., a corporation of Delaware No Drawing. Application June 3, 1942, Serial No. 445,658

6 Claims. (Cl. 99—193)

The present invention relates to processes for quick-freezing comestibles and comprises, more specifically, an improved two-step process by which comestibles may be frozen as individual units, known to the trade as "loose pack" and in such a way that the natural properties thereof are preserved while the comestibles are being reduced to a frozen condition and to such temperatures that they may be handled without deterioration in subsequent operations necessary to the handling and packaging of the comestibles before they are placed in the cold storage warehouse to be held for later distribution and sale.

More specifically this improved process is characterized by a first step of freezing very rapidly the surface layers of the individual units of the comestible by means of a direct contact refrigerant so selected as to be entirely compatible with the particular food product and under conditions which will result in the almost instant freezing and solidification of the surface layers of the individual units, before osmosis has taken place to an appreciable extent, and also in lowering the internal temperature of the units, but not necessarily causing them to become hard frozen all the way through; and then as a second step the further extraction of heat from the comestible so as further to lower the temperature and to complete the freezing of the product by some other and different freezing means or condition that, had it been applied to the unfrozen comestible directly and before the first step, would have definitely impaired the quality of the final quick-frozen comestible.

An object of this invention is to provide on the surface of the comestible, simultaneously with the rapid surface freezing or surface-hardening effect, a protective film consisting of a mixture of the direct contact refrigerant and some of the pectins and juices of the comestible. Such a protective film not only reduces the dehydration loss during a second freezing step, in which very cold air may be the refrigerant, since the vapor pressure of this film containing the dissolved direct contact refrigerant is much lower than that of water or of ice at the same temperature and therefore the rate of evaporation is much less, but this protective film persists throughout the storage life of the product and greatly reduces the amount of evaporation or dehydration during storage. This is very important since all quick-frozen foods, regardless of the type package, lose moisture either to the inside surface of a tight package or to the cooling coils of the warehouse, and the extent of this dehydration is an important factor in determining the quality after a prolonged storage period. The package surrounding the comestible is the second line of defense against this dehydration, but the surface film is the first line. If this film is water, as is generally the case, the rate of evaporation is many times as great as when the film consists of a concentrated solution of sugar or of a mixture of sugar and salt, for example.

It is well known that certain refrigerating media impart undesirable properties to comestibles into contact with which the media are brought directly. As noted above, low temperature air exerts a strong dehydrating effect upon products subjected directly thereto—causing a definite loss in weight, a toughened outer skin detectable on eating, and a considerably reduced storage life. As another example, salt brine imparts an objectionable salty bitter taste to certain comestibles. On the other hand, these media are capable of removing heat from the comestibles at a rapid rate and of reducing the temperature of the comestible to a low point, due to the fact that these media may be used at extremely low temperatures—salt brine at about 0° F. and air at 10° F. to —30° F. or lower. These low operating temperatures permit the temperature of the comestibles to be effectively reduced to approximately 0° F., which is sufficiently low to enable the loose-pack comestible to be removed from the freezing chamber for a period long enough for packaging and other necessary handling, before entry into the cold storage warehouse, without causing the temperature of the comestible to rise to such a point that it becomes partially defrosted and thus subject to deleterious forces.

For example, we have found that weighing, packaging, sealing, placing in cartons and trucking to the warehouse of loose-pack quick-frozen products, packaged after freezing, permits a rise in temperature of the comestible from 5° F. to 15° F., depending on conditions. If the products from the quick-freezing chamber is at about 0° F., this rise in temperature is not harmful. However, when the temperature of the product from the freezer is as high as from 10° F. to 17° F. the factor of safety is too small and damage is likely to result.

Freezing apparatus utilizing plates and the like is not practical for use in freezing certain products because of the crushing and bruising effect of the apparatus on the product. Moreover, this plate type of indirect freezing is usually employed for pre-packaged products and cannot be employed in producing loose-pack fruits and vegetables unless scrapers are used, which in turn are likely to injure tender fruits, for example, unless they have been surface-hardened by some other freezing method as a first step.

The use of these otherwise desirable media, therefore, is restricted and considerable difficulty has been experienced in freezing comestibles such as soft fruits, berries such as strawberries, and vegetables such as peas, beans, corn and the like, wherein direct contact with the refrigerent is likely to impart objectionable taste or other undesirable properties to the comestible, or to change the chemical and physical properties of the comestible by dehydration, for example, and wherein the use of plates or other contact freezing mechanism is likely to bruise or misshape the product.

On the other hand, certain compatible refrigerating media, such as, sugar solutions and neutral solutions of sugar and salt, have the inherent disadvantage of not being usable with efficiency at temperatures low enough to reduce the comestibles to sufficiently low temperature to withstand subsequent operations, such as packaging and the like, in a non-refrigerated room and during which time the temperature of the product is necessarily raised. Suitable invert or high levulose sugar solutions, for example, are not sufficiently fluid below about 12° F. to be used efficiently, while sucrose solutions are not ordinarily usable at temperatures below about 25° F., although these solutions are particularly useful in quick-freezing fruits, such as strawberries. The above temperatures are sufficiently low to quick-freeze the product satisfactorily and in a very short time, but the product leaves the freezer at a temperature about 2° F. higher than the solution, and at such temperatures the quick-frozen product cannot be allowed to warm up more than a very few degrees without producing deleterious results. Likewise neutral solutions of salt and sugar, particularly suitable for quick-freezing vegetables, cannot be used effectively at temperatures much below 9° F. A preferred method of using such sugar solutions is fully described in Ser. No. 110,964, copending application of our associate Harry A. Noyes, and a preferred method of using neutral solutions may be found in U. S. Pat. No. 2,211,153, also granted to Harry A. Noyes, on August 13, 1940.

The present invention has as its principal objective the utilization of refrigerants of the type discussed above in such a way as to minimize or overcome their disadvantages and to take advantage of their desirable characteristics. The several important advantages inherent in the use of such direct contact refrigerants as invert sugar, high levulose sugar, and neutral solutions of salt and these sugars, at moderate concentrations at which the viscosity will be low are as follows: (1) the flavor is improved because of the small amount of the refrigerant that adheres to the surface and even penetrates the surface of the product, (2) the hygroscopic low-vapor-pressure protective film greatly reduces dehydration during any subsequent treatment and during storage, (3) the rapidly-flowing directly applied low-viscosity solution freezes the surface layers of the individual units of the product more rapidly than any other known process, and produces a surface-hardening effect or frozen shell that protects the product during later steps, as discussed in detail below, and (4) from the standpoint of merchandizing the final product, this process has perhaps the most important advantage of all, in that it keeps the product bright, with a moist fresh appearance, due to the film of adhering solution, some part of which appears to remain in the liquid phase even under storage conditions. This greatly improved eye-appeal—as contrasted with the greyish appearance of most quick-frozen products, due to the presence on the surface of many very fine ice crystals—intrigues the customer to buy this product in preference to others, and the enhanced flavor of the product as well as the improved tenderness and quality, due to the fact that dehydration has been prevented by the film, causes the customer to continue to purchase these products.

The surface-hardening effect, mentioned above, is most important when direct contact refrigerants are employed in the quick-freezing of loose-pack vegetables and fruits, particularly those that are soft and juicy. As is well known, the juice of a strawberry, for example, contains a much lower sugar concentration than a sugar solution suitable for a direct contact refrigerant, and thus water, or juice, tends to migrate from the berry into the more concentrated refrigerant when the two are brought in contact, in an endeavor to dilute the refrigerating solution. This phenomenon is called osmosis. As soon as the surface layers of the berry are surface-hardened, this osmosis ceases as far as practical considerations are concerned. If the surface-hardening is sufficiently rapid, very little osmosis will occur. If the rate of freezing is slower the amount of osmosis will be greatly increased and the product correspondingly impaired.

In order to bring about a rapid surface-hardening effect it is essential that the direct contact refrigerating solution of sugar or of sugar and salt be of low viscosity—of the order of say, 100 centipoises, rather than of several hundred centipoises. At the temperatures employed solutions containing sugar become very viscous, and if this viscosity is too high, the rate of flow over the surfaces of the loose pack vegetables and fruits becomes so low that the somewhat warmed solution on the surface of the product tends to cling to the surface and is flushed off and replaced by fresh cold solution with great difficulty. Rapid surface-hardening can be obtained only when the cold solution flows rapidly over the surfaces and is rapidly replaced with the oncoming fresh solution, so as to avoid as far as possible the insulating effect of a film of partly warmed solution between the surface and the fresh cold solution.

It is well understood that a more concentrated solution can be operated at a lower temperature, but due to this viscosity effect the rate of freezing (and of surface hardening) is lower with say a 60% solution of invert sugar than with a 45% solution. Thus with a 60% solution a considerably greater amount of osmosis takes place, not only because of the greater concentration which is well understood, but because the surface layers are not frozen as rapidly, and the period over which osmosis occurs is extended. The loss in weight of strawberries during freezing with a 60% invert sugar solution is often as high as 12%, whereas with a 45% solution under like conditions the loss will be negligible. The loss in weight referred to is actually the loss of juice from the comestible due to osmosis.

Thus as a specific illustration of one of the variations of our improved process, in cases when it is desirable to freeze soft fruits, such as strawberries, with a minimum loss of juice to the solution by osmosis, and at the same time completing the freezing at a temperature relatively close to 0° F. we prefer to proceed as follows: Two different solutions of invert sugar are employed that for the first step having a concentration between 40% and 45% total solids and the second solution being more concentrated, 60% or more. The minimum operating temperature of the first is about 17° F. whereas the more concentrated solution can be used at around 5° F., without difficulty from the separation of a solid phase on the cooling coils of the heat exchanger. The first solution is of low viscosity and even at the operating temperature it flows over the cooling coils and through the layer of berries at a rapid rate, the partially warmed up solution being rapidly replaced with fresh cold solution, with the result that the surface layers of the individual berries are surface-hardened within a period of about one minute, and with practically no loss of juice from the fruit to the sugar solution. The second solution, applied in a separate contacting section of the freezing unit, or if desired in a second unit, immediately after the fruit leaves the first section, will not extract heat at as rapid a rate as did the first less viscous solution, but due to the lower operating temperature, it will finally reduce the temperature of the frozen product to a lower temperature, about 5° F. The times of contact with the two solutions may be proportioned as desired, provided that the berries are left in contact with the first solution long enough to surface-harden the fruit and to lower the internal temperature of the individual units to near the freezing point or even to hard freeze the fruit all the way through. The important point of the first solution is the rapid freezing of the surface layers before osmosis occurs, a feature which the more concentrated solution cannot accomplish. The first solution may be used to complete the freezing of the product, but the final temperature of the frozen product will be 18° F. or 19° F. instead of 5° F. or 6° F. In commercial practice the total time for freezing strawberries varies from 15 to 20 minutes, depending on the size of the largest berries and the rate at which the refrigerant solution is circulated, and this period may be proportioned conveniently about half and half between the two solutions.

Any convenient method of contacting the refrigerant solution with the berries in the above illustration may be employed, such as immersion, spraying or pouring, although we prefer to spread out the berries in layers a few inches deep on an endless woven wire belt arranged to pass through a chamber or tunnel in which the product is showered with the refrigerant as a coarse spray or with stream falling from a low head, so as not to injure the fruit. The refrigerant solution is pumped to the highest point in the system and from there allowed to flow by gravity over cooling means and then over the product to be quick frozen. If desired the cooling means may be below the belt carrying the berries. Perforated pans are usually employed to insure proper distribution over the cooling coils and similar pans may be used to produce streams from holes or slots to flow over the layer of berries. The solution is thus alternately circulated over cooling means and over the product until the latter is frozen. In the above example, where two solutions of different concentration are employed, the chamber would be divided into two sections and two coolers and two pumps would be used, the two solutions being circulated independently.

This surface-hardening effect has other advantages. Once the soft fruit, such as a strawberry, has been surface-hardened, it can be roughly handled without injury. For example, the second step of the freezing process, after surface-hardening, can be carried out in a rotating drum in contact with cold air, or with the externally refrigerated walls of such a drum. Or the surface-hardened product may be placed on refrigerated plates and be pushed and scraped around by blades, so that a very low temperature can be obtained in the final product without bruising or otherwise injuring the product.

The following specific application of our process again illustrates the advantage of case-hardening. Soft fruits, like strawberries, cannot be piled deep on a moving belt or other supporting medium and showered or otherwise contacted with a flowing compatible refrigerant without mushing down to a certain extent. With soft berries a 2" or 3" layer is about the limit if the mushing effect is to be avoided, so that the under layers are not in part blanketed by the squashed together upper layers, with the result that the under layers are not well frozen, the solution tending to flow over and around the tightly packed berries rather than flow down between the individual berries of the layer. Such blanketed areas leave the freezer while still in part unfrozen, and although they will freeze completely during storage in the warehouse at about 0° F. this will not be true quick freezing, and moreover, such partially frozen areas during packaging operations will warm up to the point where juice and surface held solution will drain from the product and accumulate in the package, and both these results will injure the quality of the product.

With firmer products, like lima beans, the depth on the belt may be as high as 8 inches without obtaining this blanketing effect, since the solution more readily finds passages through the mass. But even with relatively firm products like lima beans, there is a tendency to settle down into a compact mass when thick layers are used, unless first surface-hardened so that the individual units of the comestible become so hard as not to be distorted appreciably by pressure.

Thus the capacity of such a continuous belt freezer is seriously reduced by this mushing down effect when soft fruits are being frozen, and in any case, if first surface-hardened in a preliminary freezing operation a deeper layer may be used and without the damage to the product and the reduction in capacity of the freezer, that otherwise would be the case.

We prefer to freeze strawberries by surface-hardening them in thin layers on a moving belt while being contacted with the sugar containing refrigerant, and then place them on a second belt in much deeper layers—two to four times as deep—and further contacting the product with the refrigerant. The two or more belts may be in separate chambers or tunnels, or in different sections of one tunnel, and may be contacted with the same or different refrigerating solutions; or the several belts can be arranged one above the other in a single tunnel, the product from the top belt dropping to the next and so on, one belt moving in one direction and the next under moving in the opposite direction, the top belt moving at a higher linear speed than the under belts so that the fruit will be piled in thin layers on the top belt, but will pile up deeper on the under belts, depending on the relative speeds. The belts may be arranged to contact the product by immersion in a trough or the product may be showered by sprays or by pouring, and in the later case the same solution may be permitted to flow down over the several belts, or separate sprays or other devices may be arranged to furnish each belt with fresh solution.

Another exemplification of our invention, that is concerned principally with the advantage of the protective film during the second stage of a multi-type freezing operation, is described now in detail, so that our invention may be clearly understood. This description applies specifically to strawberries, but is applicable to most fruits and berries without important change, and is applicable to vegetables if a neutral solution of sugar and salt is used instead of the invert sugar solution used for fruits.

The strawberries may be prepared for freezing in the usual manner by capping and washing, although we prefer to reverse this process and wash first and then cap the berries, so as to lose less juice by bleeding into the wash water. In many cases, where the berries are grown on straw and are otherwise handled in a clean manner, we have found it advisable to omit the washing step entirely, the berries being capped and at once spread out on the freezing belt. The refrigerating solution circulated over the belt and product is sufficient in such cases to remove completely the sand particles adhering to the fruit, and since this solution is continually filtered the sand and other solid matter rinsed off from the fruit are readily eliminated. The refrigerating solution, preferably of invert sugar, is applied to the berries in the form of a shower or spray or poured on in thin sheets or streams so as to strike the fruit with but little force. The sugar solution must be of such concentration and viscosity that it can be pumped over refrigerating coils and so that it will flow over these coils at a rapid rate and without the separation of more than a small amount of a solid phase. With a solution of low viscosity the temperature of the coils may be as much as 15° F. lower than the temperature of the solution, and a high capacity and excellent efficiency of heat transfer is obtained. If a too viscous solution is employed, the rate of flow over the coils is much slower, and a solid phase will separate out to such an extent that caking onto the coils will occur, unless the temperature of the coils is maintained much nearer the temperature of the solution, and such a cooler will have a lower capacity and operate less efficiently. A suitable solution for the purpose is an invert sugar solution having a concentration of 40% to 52%, and satisfactory operating temperatures will vary from 13° F. to 18° F., the temperature of the cooling coils being at zero or just below, for a high rate of flow over the coils. It is understood, of course, that other types of sugars and other concentrations may be employed, so long as their viscosity or their freezing temperatures do not become so high as to render the process commercially unfeasible.

The berries are spread out on an endless perforated or preferably woven wire belt in layers from 2 to 6 inches deep, depending on the firmness of the fruit, and the refrigerated sugar solution is applied directly to the fruit at the rate of from 300 to 500 gals./min. for a capacity of about 1500 pounds of berries per hour. The solution is rapidly drained from the fruit, screened to remove solids, and is thereafter alternately circulated over the cooling coils and the fruit. During this operation and at the end of 20 minutes or less the berries are hard frozen and at a temperature of from 14° F. to 19° F. The surface-hardening effect on the surface is complete at the end of about a minute so that but little osmosis occurred. The berries have acquired their surface film that will maintain their bright fresh appearance and that will protect them from dehydrating during subsequent treatment and during storage. It is now desired to lower the temperature to the vicinity of zero F. so that the warming up during the packaging operations will not injure the product.

This second step of lowering the temperature of the fruit to about zero F. is readily accomplished in an air blast tunnel of any well known type. The air temperature may vary from just below zero F. to as low as thirty below zero F. The already frozen product will be quickly lowered in temperature and without the very important and deleterious effect of dehydration which would have occurred if the same berries had been entirely frozen in the air blast and without the first step of freezing with an entirely compatible direct contact refrigerant which furnished the film that protected the fruit from dehydration during the second step, required to obtain the lower temperature.

Moreover, the ordinary air frozen loose pack product is not "loose pack" when it is removed from the freezer—it is frozen together in a firm cake, the units being joined together by the frozen water on the surfaces. Before packaging such products must be broken up by a crushing operation, which often injures the product. However, when coated as a first step with a protecting film containing sugar, as in our new and improved process, the product does not freeze solid into a hard cake, but is removed from the freezer as a truly loose pack product.

As a variation of the above two-step process which will produce almost the same product, and which will be particularly useful should the available air blast freezing capacity greatly exceed the capacity of the direct contact freezer, and should it be important to obtain as large a daily capacity as possible during the short strawberry season, for example, the following may be employed. The berries may be passed through the tunnel or other unit used for bringing the fruit in direct contact with the desired compatible direct contact liquid refrigerant at a relatively high rate, so that the time period in contact with the solution is reduced from about 20 minutes to a shorter period, from 2 to 5 minutes. This will serve to surface-harden the fruit and to coat the fruit with the protecting film so that it will be protected against dehydration and caking together in the cold air freezer. The surface-hardened and film-covered fruit is discharged from the direct contact freezer and immediately spread on trays or on the air tunnel belt and subjected to the freezing action of the law temperature air until freezing is complete and the temperature of the product is as near zero F. as desired. Thus again the advantage of the novel two-step process is demostrated—a better loose-pack product is obtained, without dehydration and without caking together, with the flavoring and improved appearance due to the protective film, than could have been obtained if the complete job of freezing had been done in the air freezer alone, and on the other hand the product leaves the two-step process at much lower temperature and with a greater factor of safety against the hazards of handling and packaging than would have been possible with the direct contact freezer alone.

It will be apparent that the first freezing stage can be accomplished by direct contact refrigerating media and concentrations other than those mentioned, provided that the solutions used are compatible with the comestible being frozen, and provided that temperatures, viscosities, depth of the layer of product and rate of circulation of the direct contact refrigerant are such that at least the surface hardening effect is accomplished in a very short time—from 1 to 5 minutes—so that osmosis will be at a minimum. For freezing vegetables a salt and sugar mixture is particularly suitable. The essential point is that the first freezing operation is carried out by contacting the comestibles directly with a refrigerating medium that is wholly compatible therewith and is capable of imparting to the comestible a case-hardened outer shell and a protective film that will fortify the comestibles against quality impairment or injury during the subsequent and more drastic treatment necessary to bring the temperature of the comestible down to the desired low value. By "quality impairment" we mean any process or storage steps that causes dehydration of the product itself, that causes an appreciable amount of osmosis, that tends to crush and distort the shape of the individual units, that changes the appearance of the final frozen product from the fresh, moist appearance of the unfrozen comestible to a dull greyish white, for example.

It will be apparent from the foregoing description that there are two protective layers formed in carrying out the first step of our novel process: (1) the film of a gel-like consistency formed on the surface of the individual units by the pectins and juices of the comestible and the sugar of the refrigerant, and (2) the shell or surface-hardened surface layer. Each of these two protects the product but in different ways and against different dangers. Thus, the film, because of its low vapor pressure protects against dehydration during final air freezing and during storage. It also protects against the "quality impairment" of a greyish-white appearance when frozen, instead of a fresh moist appearance. The shell protects against crushing when the product is piled up in thick layers, and against crushing or distortion when pushed around on a refrigerated plate or when squeezed between refrigerated plates.

From the foregoing description of the invention it will be apparent that the invention is susceptible to considerable modification, and, therefore, the typical examples of the invention should be considered as illustrative and not as limiting the scope of the following claims.

We claim:

1. A multi-step method of quick freezing comestible units in a loose free-flowing mass, which consists in passing a liquid refrigerant of low viscosity containing sugar over and in direct contact with the unfrozen units, thereby coating each unit with a protective low-vapor-pressure film consisting of a gel-like layer composed of said sugar-containing refrigerant and the juices and pectins of the comestible and preventing appreciable osmosis from the units; continuing the refrigerant contact with the units over a period of time and at a temperature approximating 13 to 18 degrees F. thereby rapidly quick-freezing hard protective outer shells in the units beneath said film, and thereafter completing the quick freezing of the units by contacting them with a refrigerant at a lower temperature which solidifies the units throughout their mass.

2. A multi-step method of quick freezing comestible units in a loose free-flowing mass, which consists in passing a liquid refrigerant compatible with the comestible over and in direct contact with the unfrozen units in a manner to form, before any desiccation takes place, a hard frozen protective film over each unit consisting of a mixture of the refrigerant and some of the pectins and juices of the comestible, continuing the passage of the refrigerant over the units for a period of time and at a quick freezing temperature so as to form under the protective film an outer solidified shell on each unit, and thereafter subjecting the resulting product to a refrigerant at a substantially lower temperature and for a period of time sufficient to quick freeze and lower the temperature of the interior of the units to a point at which the resulting product will remain unimpaired for the limited period of time necessary to package the product in a warmer atmosphere.

3. A multi-step method of quick freezing comestible units in mass, which consists in passing a liquid refrigerant of relatively low viscosity and compatible with the comestible over and in direct contact with the unfrozen units for a period of time and at a quick freezing temperature approximately 13° to 18° F., thus rapidly forming a frozen protective outer shell on each unit before any desiccation or any substantial osmosis has taken place, and thereafter subjecting the resulting product to direct contact of a refrigerant of higher viscosity at a substantially lower temperature and for a period of time sufficient to quick freeze the interior of the units and leave them at a relatively low temperature.

4. A method of quick freezing relatively soft and juicy comestible units, which consists in first quick freezing protective outer shells on the units by direct contact of a liquid refrigerant of relatively low concentration and at a temperature approximating 13° to 18° F. with the unfrozen units before substantial osmosis occurs, the refrigerant being of low viscosity, flowing rapidly over the product and being rapidly replaced in contact therewith, and thereafter completing the quick freezing of the entire units at a substantially lower temperature by direct contact of a liquid refrigerant of higher concentration therewith while the said shells protect the units against bruising and osmosis.

5. A multi-step method of quick freezing strawberries or the like, which consists in passing a refrigerant sugar solution of relatively low viscosity over the unfrozen berries to quick freeze protective outer shells thereon at a rapid rate and before any desiccation or any substantial osmosis occurs and quick freeze the berries to a temperature approximately 15° F., and thereafter lowering the temperature of the berries to approximately zero degrees F. by moving contact of a gaseous refrigerating media of sub-zero temperature therewith.

6. A multi-step method of quick freezing strawberries, which consists in circulating a refrigerant sugar solution of relatively low viscosity over the unfrozen berries to form a closely adhering protective film of sugar, pectin and juice and to quick freeze outer shells thereon while the berries are drenched in said solution, said films and said shells protecting the berries against subsequent dehydration, bruising and freezing together and maintaining their original bright and fresh appearance, and thereafter quick freezing the berries to approximately zero degrees F. in contact with another refrigerant at sub-zero temperature.

CHARLES H. WELLING.
CLARENCE K. REIMAN.

REFERENCES CITED

The following references are of record in the file of this patent:

UNITED STATES PATENTS

| Number | Name | Date |
|---|---|---|
| 1,969,832 | Beard | Aug. 14, 1934 |
| 2,237,257 | Finnegan | Apr. 1, 1941 |
| 2,263,452 | Birdseye (a) | Nov. 18, 1941 |
| 2,228,999 | Birdseye (b) | Jan. 14, 1941 |
| 2,200,331 | Fisher | May 14, 1940 |
| 2,211,153 | Noyes | Aug. 13, 1940 |
| 2,164,362 | Taylor | July 4, 1939 |
| 2,229,000 | Birdseye (c) | Jan. 14, 1941 |